United States Patent

[11] 3,629,797

[72] Inventor William C. Dillon, Sr.
 Van Nuys, Calif.
[21] Appl. No. 852,019
[22] Filed Aug. 21, 1969
[45] Patented Dec. 21, 1971
[73] Assignee W. C. Dillon & Company, Inc.

[54] MAGNETIC SIGNAL TRANSMISSION METHOD AND MEANS
 10 Claims, 3 Drawing Figs.

[52] U.S. Cl. ..................................................... 340/8 R,
 114/16 R
[51] Int. Cl. ....................................................... H04r 17/00
[50] Field of Search .......................................... 340/4, 1 L,
 8, 195, 197; 191/10; 114/16 R; 335/151

[56] References Cited
 UNITED STATES PATENTS
 3,388,354 6/1968 Myatt et al. ................... 335/151

2,556,346 6/1951 Stromberg ..................... 340/1 L
3,351,035 11/1967 McLean ........................ 114/16 R

*Primary Examiner*—Rodney D. Bennett, Jr.
*Assistant Examiner*—Brian L. Ribando
*Attorney*—Pastoriza and Kelly ABSTRACT: A method and means is provided for transmitting electrical signal information through an iron plate by securing a nonmagnetic insert member in the iron plate and providing a flux carrier means secured within the nonmagnetic insert member. Portions of the flux carrier means are adjacent to opposite surfaces of the iron plate so that by positioning a magnet adjacent to one portion, flux is transmitted through the flux carrier means to the other portion on the other side of the iron plate. By providing a magnetic flux responsive means such as a reed switch on this other side juxtaposed the other portion of the flux carrier means, signal information may be passed through the iron plate by way of the flux carrier means, the presence of the signal being detected by the magnetically operated switch.

PATENTED DEC 21 1971  3,629,797

INVENTOR:
WILLIAM C. DILLON
BY
Elliott & Pastoriza,
ATTORNEYS.

MAGNETIC SIGNAL TRANSMISSION METHOD AND MEANS

This invention relates to the passing of signal information through a plate or wall, and more particularly to a novel method and means for transmitting electrical signal information magnetically through an iron plate.

BACKGROUND OF THE INVENTION

There are many situations in which it is desirable to pass signal information through a wall or plate structure without in any way impairing the integrity of the plate. For example, in underwater vessels such as deepsea diving bells, submarines, and the like, it is extremely important that the hull, normally formed of iron, does not have any weak areas. The pressure differential is enormous at great depth and any holes for the purpose of passing electrical leads from the exterior to the interior of the vessel can often result in an unsafe condition, not only from the standpoint of hull strength but more particularly with respect to leakage problems.

While several devices have been proposed for passing electrical leads through an iron plate or hull, electrical insulation is necessary and it is this insulation which constitutes the weak point in the pass-through device. There are simply not readily available electrical insulating materials of the same or greater strength than the metal forming the hull itself.

BRIEF DESCRIPTION OF THE PRESENT INVENTION

With the foregoing in mind, the present invention contemplates a novel means of passing signal information through a plate such as an iron plate constituting a hull portion of an underwater vessel, in a manner such that all metal construction is provided so that the integrity with respect both to strength and sealing of the plate is in no way impaired.

Briefly, the foregoing is accomplished by a method and means in which electrical signal information can be magnetically transmitted through the iron plate, the method contemplates the steps of inserting a magnetic flux carrier means in the plate with portions of the means adjacent to opposite surfaces of the plate; positioning a magnet adjacent to one of said portions so that its flux filed passes through the plate by way of the flux carrier means, this flux field representing the signal information; and positioning a magnetic flux responsive means adjacent to the other of said portions to detect the flux field and thereby detect the signal information. Where an iron plate or metallic hull is itself a flux carrier; that is, of magnetic material, the method contemplates the additional step of providing a nonmagnetic insert member surrounding the flux carrier means, the nonmagnetic insert member being secured in the iron plate so that the flux carrier means is isolated from direct physical contact with the iron plate.

A preferred means or apparatus for carrying out the method constitutes the securement of a nonmagnetic insert member in an opening formed in an iron plate. This nonmagnetic insert member may, for example, constitute aluminum or brass. A magnetic flux carrier insert member, such as soft iron, in turn hermetically secured within the nonmagnetic insert member so that the magnetic flux carrier insert member is magnetically insulated from the iron plate. Portions of the magnetic flux carrier insert member are disposed adjacent to opposite surfaces of the iron plate so that an electromagnet may be brought into juxtaposition with one of the portions. A magnetic flux responsive means, such as a reed switch, is juxtaposed to the other of the portions whereby the electromagnet may be energized by electrical signal information and thereby transmit its flux field through the magnetic flux carrier insert to the other of the portions to operate the magnetic flux responsive means.

The nonmagnetic insert and flux carrier insert may both be made of metal of equal or greater strength than the iron plate itself so that integrity of the plate or hull in the case of a vessel is assured particularly when subjected to high differential pressures.

BRIEF DESCRIPTION OF THE DRAWINGS

A better understanding of the invention will be had by referring to the accompanying drawings, in which.

DETAILED DESCRIPTION OF THE PREFERRED EMBODIMENTS

Figure 1:
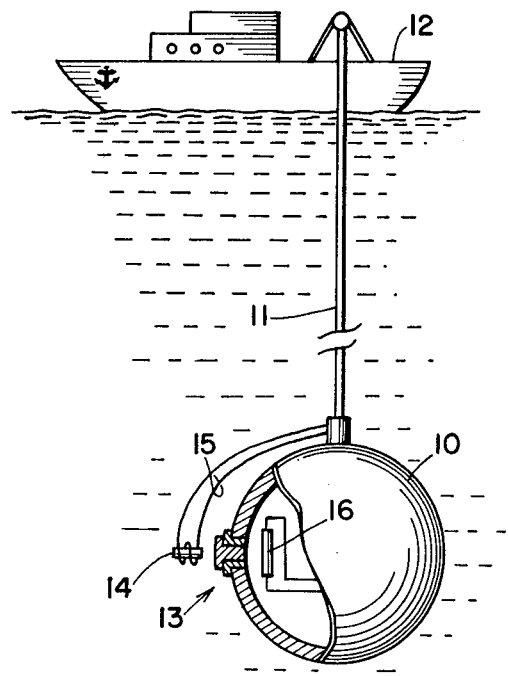
FIG. 1 is an elevational view partly broken away showing an underwater vessel with which the present invention is used for magnetically transmitting signal information from the exterior to the interior of the vessel.

Referring first to FIG. 1, there is shown and underwater vessel in the form of a diving bell or sphere 10 supported by cable 11 connecting to a suitable hoist on a surface vessel 12. In order to transmit signal information from the exterior to the interior of the vessel 10, there is provided a magnetic transmission means in a portion of the wall of the vessel as designated generally by the numeral 13. As schematically illustrated, an electromagnet 14 may be energized by suitable leads 15 carrying the desired signal information to be transmitted. Magnet 14 is juxtaposed an exterior portion of the magnetic transmission means 13 such that flux is carried through the magnetic transmission means and thus through the wall of the vessel to a suitable magnetic flux responsive means 16 within the vessel. In FIG. 1, the elements described are shown in pure schematic form for simplicity, the size of the magnetic transmission means being greatly exaggerated for purposes of clarity.

Figure 2:
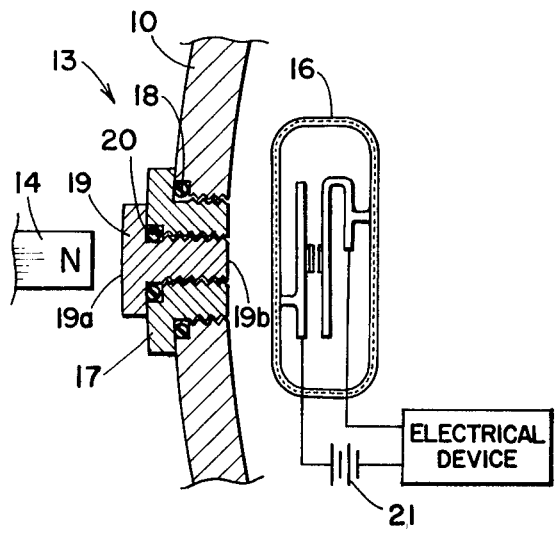
FIG. 2 is an enlarged cross-sectional view partly schematic in form of the magnetic transmission means utilized in the structure of FIG. 1; and, FIG. 3 is a view similar to FIG. 2 showing a modified construction of the invention.

Referring now to FIG. 2, details of the magnetic transmission means 13 are shown. In the particular embodiment wherein the wall of the vessel 10 constitutes an iron plate, a threaded opening is formed in this plate for securing in threaded engagement therewith a nonmagnetic insert member 17. An O-ring 18 may be provided as shown to assure proper sealing against outside liquid.

Within the nonmagnetic insert member 17 there is threadly secured a flux carrier means in the form of an insert 19. Again, an O-ring seal 20 may be provided between the flux carrier insert 19 and nonmagnetic insert 17. It will be noted that portions of the flux carrier insert 19 such as 19a and 19b are adjacent to opposite sides of the iron plate forming the wall portion of the vessel 10.

The magnetic flux responsive device 16 of FIG. 1 is illustrated as a simple reed-type switch in FIG. 2 wherein the contacts will close in the presence of a magnetic flux field. Closing of these contacts may serve to connect a source of electrical energy such as a battery 21 to any suitable electrical device as schematically indicated by the box.

When the magnet, a fragmentary portion of which is shown at 14, is positioned juxtaposed to the one portion 19a of the flux carrier insert 19, the flux field of the other portion 19b on the other side of the iron plate. By positioning the magnetic switch 16 juxtaposed this other portion, the contacts thereof will be closed in the presence of a magnetic flux field to thus operate the desired electrical device.

Figure 3:
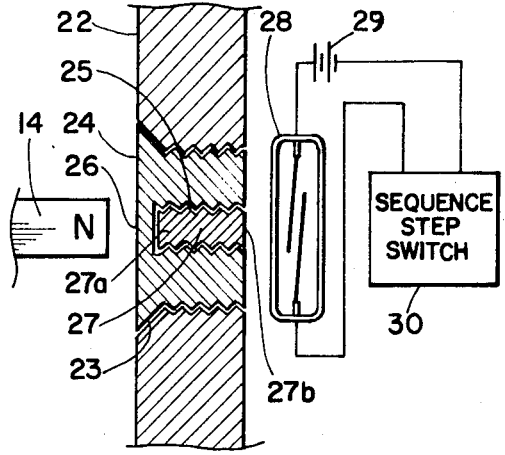

In the embodiment of FIG. 3, there is shown an iron plate or wall 22 which might constitute the hull of a submarine. In this construction, there is again formed a threaded opening in the iron plate 22 with a beveled entrance surface 23. A nonmagnetic insert in the form of a flat head beveled threaded bolt 24 is threadedly secured in the hole with the beveled entrance portion thereof seating the beveled head of the bolt so that a flush surface is provided between the top surface of the bolt and the exterior surface of the iron plate 22.

The bolt 24, as shown, is counterbored as at 25, this counterbore terminating short of the top surface of the bolt head so that this surface is continuous; that is, it closes the end of the counterbore as shown at 26.

A flux carrier means in the form of an insert member 27 in turn is threadedly secured within the counterbore 25. The arrangement is such that portions 27a and 27b of the flux carrier insert 27 are adjacent to opposite sides of the iron plate 22.

A magnetic flux responsive reed type switch 28 is shown in FIG. 3 juxtaposed to the portion 27b for operation by flux carried by the flux carrier insert member. In the embodiment shown, this reed switch 28 is arranged to connect electrical energy from a source 29 to a sequence step switch 30. The sequence step switch may include a plurality of relays which are arranged to be progressively energized in response to electrical pulses or signals supplied upon closing and opening of the switch 28 so that a number of sequential operations may be carried out.

OPERATION

The operation of the invention will be evident from the foregoing description. Thus, in either of the structures shown in FIGS. 2 or 3, when it is desired to transmit signal information through the iron plate, it is only necessary to position a magnet or energize an electromagnet previously properly positioned juxtaposed to the one portion of the flux carrier insert. Magnetic flux fields generated by the magnet will then be carried by the flux carrier insert through the iron plate to the opposite side wherein this flux field may be utilized to operate the magnetically responsive switch.

Electrical signal information may thus be communicated to the interior of a vessel such as illustrated in FIG. 1 by simply pulsing the electromagnet 14 with electrical signals wherein the pulses supplied by the signals represent the particular information. The magnetic responsive means 16 within the vessel will respond since the generated flux will change in a manner controlled by the signal information. If desired, a transducer receiving sonar signals from the mother ship may be provided to electrically energize the magnet, such transducer and related equipment being disposed adjacent to the exterior of the underwater vessel.

Also, it should be understood that a permanent magnet may be utilized to transmit information through the iron plate by a diver or other person manually moving the magnet towards and away from the one portion of the flux carrier insert adjacent to the outer surface of the iron plate. Any suitable type of pulse coding may be used. The same or additional magnetic transmission means may be provided for passing signals from the inside of the vessel to the exterior. In this event, the positions of the electromagnetic and flux-responsive means would be reversed.

Since in both structures of FIGS. 2 and 3, metal is in physical contact over the entire cross section of the opening in the iron plate, the integrity of the plate is not impaired and very high differential pressures on opposite sides of the plate can be tolerated without any fear of damage or leakage. On the other hand, desired signal information can readily be transmitted by the magnetic means described.

Various changes and modifications falling within the scope and spirit of this invention will occur to those skilled in the art. The magnetic signal transmission method and means is therefore not to be thought of as limited to the particular embodiments set forth or the particular applications described.

What is claimed is:

1. A method of transmitting signal information through a plate comprising the steps of:
   a. inserting a magnetic flux carrier means in said plate with portions of said means adjacent to opposite surfaces of said plate;
   b. positioning a magnet adjacent to one of said portions so that its flux field passes through said plate by way of said flux carrier means, said flux field representing said signal information;
   c. providing a nonmagnetic insert member surrounding said flux carrier means, said nonmagnetic insert member being secured in said plate so that said flux carrier means is insulated from direct physical contact with said plate; and
   c. positioning a magnetic flux responsive means adjacent to the other of said portions to detect said flux field and thereby detect said signal information.

2. The method of claim 1, in which said plate constitutes an iron plate defining a portion of an enclosure subject to a high-pressure differential on its opposite sides.

3. A magnetic signal transmission means for passing electrical signal information through an iron plate, comprising, in combination:
   a. a nonmagnetic insert member hermetically secured in an opening formed in said iron plate;
   b. a magnetic flux carrier insert member hermetically secured within said nonmagnetic insert member so that said magnetic flux carrier insert member is magnetically insulated from said iron plate, portions of said magnetic flux carrier insert member being adjacent to opposite surfaces of said iron plate so that an electromagnet may be brought into juxtaposition with one of said portions; and
   c. a magnetic flux responsive means juxtaposed to the other of said portions, whereby said electromagnet may be energized by said electrical signal information and thereby transmit its flux field through said magnetic flux carrier insert to the other of said portions to operate said magnetic flux responsive means.

4. The subject matter of claim 3, in which said nonmagnetic insert member is in the form of a flat beveled head threaded bolt, said opening in said iron plate being threaded to receive said bolt and having a beveled entrance portion in one surface for seating said beveled head so that the top surface of said head is flush with said one surface of said plate, said bolt having a counterbore in its opposite end terminating short of said top surface of said head, said magnetic flux insert member being secured within said counterbore, said one portion of said magnetic flux insert member being positioned at the innermost end of said counterbore whereby the same is completely insulated from the environment exterior to said one surface of said plate by said top surface of said head.

5. The subject matter of claim 3, in which said magnetic flux responsive means includes an electrical switch connected between a source of electrical energy and an electrical device and responsive to the presence of a magnetic flux field to close and thereby connect said source of electrical energy to said electrical device.

6. The subject matter of claim 5, in which said electrical device includes a sequence step switch for enabling progressive switching in response to successive closings of said electrical switch.

7. THe subject matter of claim 3, in which said nonmagnetic insert member comprises a nonmagnetic metal and said magnetic flux carrier insert member comprises soft iron.

8. The subject matter of claim 7, in which said nonmagnetic metal is aluminum.

9. THe subject matter of claim 7, in which said nonmagnetic metal is brass.

10. The subject matter of claim 3, in which said iron plate constitutes part of an enclosing wall of an underwater vessel subject to a high-pressure differential on its opposite sides.

* * * * *